2,819,971
FOOD PRODUCT AND PROCESS

Hans Gunthardt, Hoboken, N. J., assignor to General Foods Corporation, White Plains, N. Y., a corporation of Delaware No Drawing. Application October 6, 1955
Serial No. 539,027

8 Claims. (Cl. 99—130)

This invention relates to an improved gelatin composition and particularly to gelatin having improved dispersibility in water.

Powdered gelatin is a well known article of commerce. Its solution usually requires the use of hot water which is necessitated because the gelatin is essentially insoluble in cold water. This is particularly disadvantageous where the gelatin is employed as a gelling agent as with gelatin jelly compositions since the water employed must first be heated to dissolve the gelatin and then cooled for gelation to occur.

Methods have been devised which improve the intrinsic cold water solubility of gelatin but it has not been possible heretofore to take full advantage of this improved solubility because of the problems of clumping and foaming attending their use. Furthermore, on attempting to disperse the cold water soluble gelatin by mechanical stirring, an excessive amount of air is incorporated into the solution resulting in foaming and a hazy gel.

These processes vary widely but generally provide drying conditions which preserve the gelatin in a molecularly dispersed, amorphous form rather than the usual crystalline form. This is brought about by drying a solution of gelatin from a sol state without passing through a gelled state. In order to assure that the gelatin will remain in a sol state until drying is completed, it is generally necessary to dry a relatively dilute solution in a thin film and to carry out the drying at a temperature above that at which gelation will occur, viz., about 40° C. Spray drying, drum drying or precipitation of the gel from solution by adding a hot solvent are suitable methods of preparing amorphous gelatin. Furthermore, as the orientation of gelatin molecules in solution to form a gel takes place over a considerable time interval even at lower temperatures, rapid drying processes such as freeze drying may be employed to improve the cold water solubility of the gelatin.

In order to realize the benefit of the improvement in cold water solubility thus obtained, it is generally desirable to reduce the amorphous gelatin to a fine particle size. But the small particle size together with the improved cold water solubility characteristics aggravate the aforementioned problems of clumping and foaming so that while the amorphous gelatin is intrinsically soluble in cold water, the presence of these problems greatly restricts its usefulness.

It has now been found that a readily dispersible amorphous gelatin composition is provided by coating comminuted amorphous gelatin with lecithin. The use of lecithin in this manner prevents the clumping of the gelatin when placed in cold water. Also, the lecithin not only serves to prevent clumping, but in the event mechanical mixing or agitation is employed, any tendency to foaming is likewise prevented since the lecithin serves as an anti-foaming agent. The discovery concerning lecithin is particularly advantageous with relation to the use of amorphous gelatins, which intrinsically have a high degree of cold water solubility, in preparing jellied desserts, salads, and the like. The ability to use cold water in the preparation of such jellied food products makes for greater convenience in the preparation of the jellied products, particularly from the standpoint of the time required for such preparations. The use of cold water instead of the hot water usually employed in making such jellied products permits the jellied product to be obtained in as little as 68–80 minutes as compared with 120–150 minutes usually required when hot water is employed.

The problem of clumping is related somewhat to the size of the gelatin particle. It is desirable, of course, as regards cold water solubility that an extremely fine particle of gelatin be employed. However, as the gelatin particle becomes smaller in size, the problem of clumping increases. As expected therefore, the benefits of this invention are realized to a greater extent in the case of the finely comminuted gelatin.

The lecithin may be added directly to comminuted amorphous gelatin and thoroughly mixed as by agitating, milling or grinding to provide the uniform mixing and coating desired. Ordinarily the lecithin is more conveniently mixed with a small amount of gelatin and the gelatin thus coated is in turn mixed with a larger quantity of gelatin to provide gelatin particles coated with the desired lecithin concentration. It is believed that a substantial but discontinuous coating of lecithin is applied to the comminuted gelatin particle and this may be effected in a number of ways.

Alternatively, the lecithin may be dissolved in a solvent such as ethyl alcohol and the solution added directly or sprayed onto the comminuted gelatin with accompanying mixing to provide the desired coating. Where the solution is added directly to small amounts of the comminuted gelatin it is convenient to provide uniform dispersion by grinding the mixture.

Dispersing the lecithin in a gelatin solution prior to drying in lieu of coating the comminuted gelatin particles will provide some benefit. This procedure, however, does not make efficient use of the lecithin and much higher levels of lecithin are required to provide optimum results.

In gelatin compositions containing sugar, the preferred process of the invention involves the addition of lecithin to a small amount of the total sugar required followed by thorough mixing therewith. This lecithin-coated sugar is then mixed with a larger portion of sugar. The latter lecithin-sugar mixture is thoroughly agitated or ground to provide a uniform dispersion of lecithin throughout the sugar. In the third step the latter lecithin-sugar mixture is added to an equal quantity by weight of gelatin, and the whole is mixed, preferably by grinding to provide a master mix with which additional quantities of sugar and other components such as buffer salts, fruit acid, flavor, color and the like may be added to provide a complete jelly mix.

The lecithin employed according to this invention may be any of the edible commercial grades obtained from either animal or vegetable sources. Examples of these include soybean, corn, and cottonseed lecithin, the latter two being described in U. S. Patent No. 2,201,064. Soy lecithin is preferred because of its ready availability. It is further preferred that the lecithin be highly purified in order that gel turbidity resulting from high concentrations of impure lecithin be avoided. Commercial grades of lecithin which are suspended in a soy oil vehicle may be employed but their use has been found less desirable because of the greater turbidity contributed by the oil. Various modified lecithins such as hydroxylated lecithin having improved hydrophilic properties have been found to function in the preferred manner, and are meant to be included within the term lecithin as used herein and in the appended claims.

The level of lecithin employed will depend on the purity of the lecithin, on the method of incorporation, and on the intended use of the gelatin composition. Lecithin is largely insoluble in water and is found in a finely dispersed state throughout the prepared gel. As such, a high concentration of lecithin causes haziness in the gel making the use of high concentrations unacceptable where a clear gel is desired. For some uses, however, such as in salads, jellied fruit juices, etc., the haze is not objectionable and high levels of lecithin may be employed.

Generally, it is preferred to coat the comminuted gelatin particles with an amount of relatively pure lecithin within the approximate range of 0.01% to 1% of the weight of the gelatin. At lower and lower levels below 0.01% foam stabilization rather than the desired foam inhibition begins to be effected by the lecithin. Levels above 1% may be employed where haziness of the gel is not a consideration, but the increase in benefits obtained generally does not justify the additional cost involved. In the case of a gelatin jelly composition for use in preparing clear dessert gels, a level of from 0.05% to 0.5% based on the weight of gelatin is most preferred from the standpoint of gel clarity.

While the manner in which the lecithin provides the improved dispersion and foam inhibition described herein has not been definitely established, it is thought that the benefits obtained are due to a combination of two factors. The first factor is the physical separation of the gelatin particles provided by the lecithin which separation retards the tendency of the gelatin particles to clump together when introduced into aqueous solution. The second factor is that of the changed surface tension of the aqueous liquid caused by the lecithin which inhibits foaming of the solution.

As specific examples of the process of the present invention, lecithin-coated comminuted gelatin is prepared in the following manners:

Example 1

100 lbs. of spray dried gelatin are combined with 0.05 lb. of soy lecithin and the mixture is ground in a ball mill for several minutes to provide a uniform coating of lecithin on the gelatin particles.

Example 2

99 lbs. of sucrose and 1 lb. of pure hydroxylated soy lecithin are thoroughly mixed and ground. This lecithin-coated sugar is then mixed with 1900 lbs. of sucrose and the whole is ground for several minutes to insure uniform distribution of the lecithin throughout the sugar. This material is then added to 2000 lbs. of spray dried gelatin and the whole is ground to provide 4000 lbs. of a master mix of gelatin and sugar coated with lecithin.

Example 3

1 lb. of soy lecithin in 1 gal. of ethyl alcohol is added to 99 lbs. of sucrose and the mixture is ground in a ball mill for several minutes. The alcohol evaporates and the lecithin is uniformly coated onto the sugar. 5 lbs. of this lecithin coated sugar are mixed with 95 lbs. drum dried, granulated, amorphous gelatin (particle size through 80 mesh) and ground in a ball mill for several minutes. In this manner comminuted gelatin coated with lecithin is provided.

Example 4

Suitable gelatin jelly compositions having the above-described advantages of this invention may be made by employing the gelatin made according to any of the three specific examples above in the following formula. Where sugar has been included with the lecithin-coated gelatin, a corresponding reduction may be made in the sugar content of the composition.

| Ingredient: | Quantity (gms.) |
|---|---|
| Gelatin, amorphous | 10 |
| Sucrose | 75 |
| Citric acid | 2.48 |
| NaCl | 0.43 |
| $NaH_2PO_4$ | 0.215 |
| $Na_2HPO_4$ | 0.215 |

In using the above composition to make a dessert gel, 473 cc. of water at room temperature (70° C.) are added to the dry mixture with a slight amount of stirring. The composition is completely dissolved within 2 minutes to provide a clear, substantially foam-free solution. On refrigeration the solution sets within 60–80 minutes to provide a completely gelled dessert.

Where drum dried amorphous gelatin is described in the above examples, it is prepared in the following manner. 15% solution of 250 Bloom acid extracted gelatin is prepared and maintained at 50° C. The solution is then fed to a Buflovak drum dryer of the atmospheric type, manufactured by the Blaw-Knox Company, Buffalo, New York. The drier is operated at a temperature equivalent to steam under the pressure of 15 lbs. per sq. inch gage. The doctor blade of the drier is adjusted to remove the gelatin immediately after drying is completed. The dried product is removed from the drum and ground to a particle size of through 60 but on 70 standard mesh screen.

It will be understood that while the invention has been described in part by means of specific examples, reference should be had to the appended claims for a definition of the scope of the invention.

What is claimed is:

1. A dry, particulate, amorphous gelatin composition comprising amorphous gelatin and coated with lecithin.

2. A dry, particulate, amorphous gelatin composition readily dispersible in water comprising a mixture of comminuted amorphous gelatin coated with lecithin.

3. A dry, particulate, amorphous gelatin composition readily dispersible in water comprising a mixture of comminuted amorphous gelatin coated with lecithin and sugar.

4. A dry, particulate, amorphous gelatin composition readily dispersible in water comprising a mixture of comminuted amorphous gelatin and lecithin, said gelatin particles being coated with a substantially non-continuous film of lecithin.

5. A dry, particulate, amorphous gelatin composition readily dispersible in water comprising a mixture of comminuted amorphous gelatin, lecithin and sugar, said gelatin particles having a substantially non-continuous coating of lecithin.

6. A dry, particulate, amorphous gelatin composition readily dispersible in water comprising comminuted amorphous gelatin, lecithin and sugar, the gelatin particles being coated with a substantially non-continuous film of the lecithin in an amount of from 0.01% to 1% of the weight of the gelatin.

7. A dry, particulate, amorphous gelatin composition readily dispersible in water comprising comminuted amorphous gelatin, lecithin and sugar, the gelatin particles being coated with a substantially non-continuous film of the lecithin in an amount of from 0.05% to 0.50% of the weight of the gelatin.

8. A process for preparing an improved amorphous gelatin composition comprising the step of coating comminuted amorphous gelatin with lecithin.

References Cited in the file of this patent

UNITED STATES PATENTS

| 1,929,732 | Zeigler | Oct. 10, 1933 |
| 1,995,281 | Epstein | Mar. 19, 1935 |
| 2,535,538 | Koch | Dec. 26, 1950 |
| 2,611,708 | Owens et al. | Sept. 23, 1952 |

U. S. DEPARTMENT OF COMMERCE
PATENT OFFICE

CERTIFICATE OF CORRECTION

Patent No. 2,819,971　　　　　　　　　　　　　　January 14, 1958

Hans Gunthardt

It is hereby certified that error appears in the printed specification of the above numbered patent requiring correction and that the said Letters Patent should read as corrected below.

Column 2, line 10, for "68-80 minutes" read -- 60-80 minutes --; column 4, line 37, strike out "and"; line 43, after "lecithin" insert a comma.

Signed and sealed this 11th day of March 1958.

(SEAL)
Attest:

KARL H. AXLINE　　　　　　　　　　　　　　　　ROBERT C. WATSON
Attesting Officer　　　　　　　　　　　　　　　Commissioner of Patents